US00RE40231E

(19) United States
(12) Reissued Patent
Snell et al.

(10) Patent Number: US RE40,231 E
(45) Date of Reissued Patent: Apr. 8, 2008

(54) HIGH DATA SPREAD SPECTRUM TRANSCEIVER AND ASSOCIATED METHODS

(75) Inventors: James Leroy Snell, Palm Bay, FL (US); Carl F. Andren, Indialantic, FL (US); Leonard Victor Lucas, Seattle, WA (US)

(73) Assignee: Conexant, Inc., Red Bank, NJ (US)

(21) Appl. No.: 10/005,483

(22) Filed: Nov. 9, 2001

(Under 37 CFR 1.47)

Related U.S. Patent Documents

Reissue of:
(64) Patent No.: 5,982,807
Issued: Nov. 9, 1999
Appl. No.: 08/819,846
Filed: Mar. 17, 1997

(51) Int. Cl.
*H04B 1/69* (2006.01)
*H04B 1/707* (2006.01)

(52) U.S. Cl. ..... 375/130; 375/142; 375/146; 375/150; 370/342; 370/441; 370/479

(58) Field of Classification Search ..... 370/441, 370/479, 342; 375/142, 130, 146, 150
See application file for complete search history.

(56) References Cited

U.S. PATENT DOCUMENTS 4,617,553 A 10/1986 Webster et al.
4,626,796 A 12/1986 Elder
4,730,340 A 3/1988 Frazier, Jr.

(Continued)

FOREIGN PATENT DOCUMENTS

EP 0 750 408 12/1996
EP 0 757 449 2/1997
EP 0 757 451 2/1997
WO WO 96/32784 10/1996

OTHER PUBLICATIONS

C. Andren, "A Brief Tutorial on Spread Spectrum and Packet Radio–TB337.1", Intersil, 3 pgs. May, 1996.

C. Andren et al., "CCK, the new IEEE 802.11 standard for 2.4 GHz wireless LANs", International IC–Taipei Conference Proceedings, DATE—no earlier than 1998.

J.H. Cafarello, "Orthogonal Signalling . . . BOK and DPSK", IFF Working Paper No. 41WP–5036, Massachusetts Institute of Technology, Lincoln Laboratory, 10 pgs., Oct. 29, 1979.

(Continued)

*Primary Examiner*—Chieh M. Fan
*Assistant Examiner*—Ted Wang
(74) *Attorney, Agent, or Firm*—Thomas, Kayden, Horstemeyer & Risley LLP

(57) ABSTRACT

A spread spectrum radio transceiver includes a high data rate baseband processor and a radio circuit connected thereto. The baseband processor preferably includes a modulator for spread spectrum phase shift keying (PSK) modulating information for transmission via the radio circuit. The modulator may include at least one modified Walsh code function encoder for encoding information according to a modified Walsh code for substantially reducing an average DC signal component to thereby enhance overall system performance when AC-coupling the received signal through at least one analog-to-digital converter to the demodulator. The demodulator is for spread spectrum PSK demodulating information received from the radio circuit. The modulator and demodulator are each preferably operable in one of a bi-phase PSK (BPSK) mode at a first data rate and a quadrature PSK (QPSK) mode at a second data rate. These formats may also be switched on-the-fly in the demodulator. Method aspects are also disclosed.

133 Claims, 8 Drawing Sheets

U.S. PATENT DOCUMENTS

| | | | | | |
|---|---|---|---|---|---|
| 4,813,001 | A | * | 3/1989 | Sloane | 702/110 |
| 5,063,571 | A | | 11/1991 | Vancraeynest | |
| 5,103,459 | A | | 4/1992 | Gilhousen et al. | |
| 5,210,770 | A | | 5/1993 | Rice | |
| 5,218,619 | A | | 6/1993 | Dent | |
| 5,309,474 | A | | 5/1994 | Gilhousen et al. | |
| 5,353,352 | A | | 10/1994 | Dent et al. | |
| 5,361,276 | A | | 11/1994 | Subramanian | |
| 5,367,516 | A | | 11/1994 | Miller | |
| 5,416,797 | A | | 5/1995 | Gilhousen et al. | |
| 5,471,497 | A | | 11/1995 | Zehavi | |
| 5,497,395 | A | | 3/1996 | Jou | |
| 5,515,396 | A | | 5/1996 | Kotzin | |
| 5,535,329 | A | | 7/1996 | Hastings | |
| 5,537,398 | A | * | 7/1996 | Siwiak | 370/204 |
| 5,577,025 | A | | 11/1996 | Skinner et al. | |
| 5,598,154 | A | | 1/1997 | Wilson et al. | |
| 5,621,752 | A | | 4/1997 | Antonio et al. | |
| 5,659,573 | A | | 8/1997 | Bruckert et al. | |
| 5,682,404 | A | | 10/1997 | Miller | |
| 5,790,534 | A | | 8/1998 | Kokko et al. | |
| 5,809,060 | A | | 9/1998 | Cafarella | |
| 5,862,182 | A | | 1/1999 | Awater et al. | |
| 6,404,732 | B1 | * | 6/2002 | van Nee | 370/209 |
| 6,442,380 | B1 | * | 8/2002 | Mohindra | 455/234.1 |
| 6,452,958 | B1 | | 9/2002 | Van Nee | |
| 6,567,389 | B1 | * | 5/2003 | Honkasalo et al. | 370/342 |

OTHER PUBLICATIONS

Kilgore, W. et al, "Four–Chip Set Supports High–Speed DSSS PCMCIA Applications", RF Design, Cardiff Publishing Co, Englewood, CO, US, vol. 18, No. 10, Oct. 1, 1995, pp. 42, 45–51.

C. Andren, "A 2.4 GHz 11 MBps Baseband Processor for 802.11 Applications", 7 pgs. May 5, 1998.

C. Andren, "High Rate DS PHY, IEEE P802.11—97/25, 17 pgs. Mar. 1997.

Harris Corporation Application Note entitled "Harris PRISM Chip Set", No. AN9614, 3 pgs. Mar. 1996.

Harris Corporation, "PRISM 2.4 GHz Chip Set", File No. 4063.4, 2 pgs. Oct. 1996.

Harris Corporation Tech Brief entitled "A Brief Tutorial on Spread Spectrum and Packet Radio", No. TB337.1, 3 pgs., May, 1996.

Harris Corporation, "Direct Sequence Spread Spectrum Baseband Processor", File No. 4064.4, 41 pgs., Oct. 1996.

* cited by examiner

HIGH DATA SPREAD SPECTRUM TRANSCEIVER AND ASSOCIATED METHODS

Matter enclosed in heavy brackets [ ] appears in the original patent but forms no part of this reissue specification; matter printed in italics indicates the additions made by reissue.

FIELD OF THE INVENTION

The invention relates to the field of communication electronics, and, more particularly, to a spread spectrum transceiver and associated methods.

BACKGROUND OF THE INVENTION

Wireless or radio communication between separated electronic devices is widely used. For example, a wireless local area network (WLAN) is a flexible data communication system that may be an extension to, or an alternative for, a wired LAN within a building or campus. A WLAN uses radio technology to transmit and receive data over the air, thereby reducing or minimizing the need for wired connections. Accordingly, a WLAN combines data connectivity with user mobility, and, through simplified configurations, also permits a movable LAN.

Over the past several years, WLANs have gained acceptance among a number users including, for example, healthcare, retail, manufacturing, warehousing, and academic areas. These groups have benefited from the productivity gains of using hand-held terminals and notebook computers, for example, to transmit real-time information to centralized hosts for processing. Today WLANs are becoming more widely recognized and used as a general purpose connectivity alternative for an even broader range of users. In addition, a WLAN provides installation flexibility and permits a computer network to be used in situations where wireline technology is not practical.

In a typical WLAN, an access point provided by a transceiver, that is, a combination transmitter and receiver, connects to the wired network from a fixed location. Accordingly, the access transceiver receives, buffers, and transmits data between the WLAN and the wired network. A single access transceiver can support a small group of collocated users within a range of less than about one hundred to several hundred feet. The end users connect to the WLAN through transceivers which are typically implemented as PC cards in a notebook computer, or ISA or PCI cards for desktop computers. Of course the transceiver may be integrated with any device, such as a hand-held computer.

The assignee of the present invention has developed and manufactured a set of integrated circuits for a WLAN under the mark PRISM 1 which is compatible with the proposed IEEE 802.11 standard. The PRISM 1 chip set is further described in Harris Corporation Application Note entitled "Harris PRISM Chip Set", No. AN9614, March 1996; and also in a publication entitled "PRISM 2.4 GHz Chip Set", file no. 4063.4, October 1996.

The PRISM 1 chip set provides all the functions necessary for full or half duplex, direct sequence spread spectrum, packet communications at the 2.4 to 2.5 GHz ISM radio band. In particular, the HSP3824 baseband processor manufactured by Harris Corporation employs quadrature or bi-phase phase shift keying (QPSK or BPSK) modulation schemes. While the PRISM 1 chip set is operable at 2 Mbit/s for BPSK and 4 Mbit/s for QPSK, these data rates may not be sufficient for higher data rate applications.

Spread spectrum communications have been used for various applications, such as cellular telephone communications, to provide robustness to jamming, good interference and multi-path rejection, and inherently secure communications from eavesdroppers, as described, for example, in U.S. Pat. No. 5,515,396 to Dalekotzin. The patent discloses a code division multiple access (CDMA) cellular communication system using four Walsh spreading codes to allow transmission of a higher information rate without a substantial duplication of transmitter hardware. U.S. Pat. No. 5,535,239 to Padovani et al., U.S. Pat. No. 5,416,797 to Gilhousen et al., U.S. Pat. No. 5,309,474 to Gilhousen et al., and U.S. Pat. No. 5,103,459 to Gilhousen et al. also disclose a CDMA spread spectrum cellular telephone communications system using Walsh function spreading codes.

Unfortunately, the conventional Walsh function spreading codes may create undesirable signal components for some applications. Moreover, a WLAN application, for example, may require a change between BPSK and QPSK during operation, that is, on-the-fly. Spreading codes may be difficult to use in such an application where an on-the-fly change is required.

SUMMARY OF THE INVENTION

In view of the foregoing background, it is therefore an object of the present invention to provide a spread spectrum transceiver and associated method permitting operation at higher data rates than conventional transceivers.

It is another object of the invention to provide a spread spectrum transceiver and associated method to permit operation at higher data rates and which may switch on-the-fly between different data rates and/or formats.

These and other objects, features and advantages in accordance with the invention are provided by a spread spectrum radio transceiver comprising a high data rate baseband processor and a radio circuit connected thereto. The baseband processor preferably includes a modulator for spread spectrum phase shift keying (PSK) modulating information for transmission via the radio circuit, and wherein the modulator, in one embodiment, comprises at least one modified Walsh code function encoder for encoding information according to a modified Walsh code. The baseband processor also preferably further comprises a demodulator for spread spectrum PSK demodulating information received from the radio circuit. The demodulator is preferably connected to the output of at least one analog-to-digital (A/D) converter, which, in turn, is AC-coupled to the associated receive portions of the radio circuit. Accordingly, the demodulator preferably comprises at least one modified Walsh code function correlator for decoding information according to the modified Walsh code. The modified Walsh code substantially reduces an average DC component which in combination with the AC-coupling to the at least one A/D converter thereby increases overall system performance. Other orthogonal and bi-orthogonal coding schemes may also be used, wherein the average DC component is preferably substantially reduced or avoided.

The modulator preferably comprises means for operating in one of a bi-phase PSK (BPSK) modulation mode at a first data rate defining a first format, and a quadrature PSK (QPSK) mode at a second data rate defining a second format. In addition, the demodulator preferably comprises means for operating in one of the first and second formats. The modulator may also preferably include header modulator means for modulating data packets to include a header at a predetermined modulation and a third data rate defining a third format, and for modulating variable data at one of the first and second formats. Accordingly, the demodulator thus preferably includes header demodulator means for demodulating data packets by demodulating the header at the third format and for switching to either the first and second formats of the variable data after the header. The third format is preferably differential BPSK, and the third data rate is preferably lower than the first and second data rates.

The demodulator may preferably comprise first and second carrier tracking loops—the first carrier tracking loop for the third format, and the second carrier tracking loop for the first and second formats. The second carrier tracking loop, in turn, may comprise a carrier numerically controlled oscillator (NCO), and NCO control means for selectively operating the carrier NCO based upon a carrier phase of the first carrier tracking loop to thereby facilitate switching to the format of the variable data. The second carrier tracking loop may also comprise a carrier loop filter, and carrier loop filter control means for selectively operating the carrier loop filter based upon a frequency of the first carrier tracking loop to facilitate switching to the format of the variable data. The carrier tracking loops permit switching to the desired format after the header and on-the-fly.

The at least one modified Walsh code function correlator of the demodulator preferably comprises a modified Walsh function generator, and a plurality of parallel connected correlators connected to the modified Walsh function generator. The modified Walsh code may be a Walsh code modified by a modulo two addition of a fixed hexadecimal code thereto. In addition, the modulator in one embodiment preferably further comprises means for partitioning data into four bit nibbles of sign (one bit) and magnitude (three bits) to the modified Walsh code function encoder.

The modulator may also include spreading means for spreading each data bit using a pseudorandom (PN) sequence at a predetermined chip rate. Accordingly, the modulator may also comprise preamble modulating means for generating a preamble, and wherein the demodulator includes preamble demodulator means for demodulating the preamble for achieving initial PN sequence synchronization.

The modulator for the spread spectrum transceiver may include a scrambler, and the demodulator accordingly preferably includes a descrambler. The demodulator may also include clear channel assessing means for generating a clear channel assessment signal to facilitate communications only when the channel is clear.

The baseband processor is desirably coupled to a radio circuit for the complete spread spectrum transceiver. Accordingly, the transceiver preferably includes a quadrature intermediate frequency modulator/demodulator connected to the baseband processor, and an up/down frequency converter connected to the quadrature intermediate frequency modulator/demodulator. In addition, the radio circuit preferably further comprises a low noise amplifier having an output connected to an input of the up/down converter, and a radio frequency power amplifier having an input connected to an output of the up/down converter. The spread spectrum radio transceiver preferably also includes an antenna, and an antenna switch for switching the antenna between the output of the radio frequency power amplifier and the input of the low noise amplifier.

A method aspect of the invention is for baseband processing for spread spectrum radio communication. The method preferably comprises the steps of: spread spectrum phase shift keying (PSK) modulating information for transmission by encoding information according to a predetermined bi-orthogonal code for reducing an average DC signal component; and spread spectrum PSK demodulating received information by decoding information according to the predetermined bi-orthogonal code. The predetermined bi-orthogonal code is preferably a modified Walsh function code.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
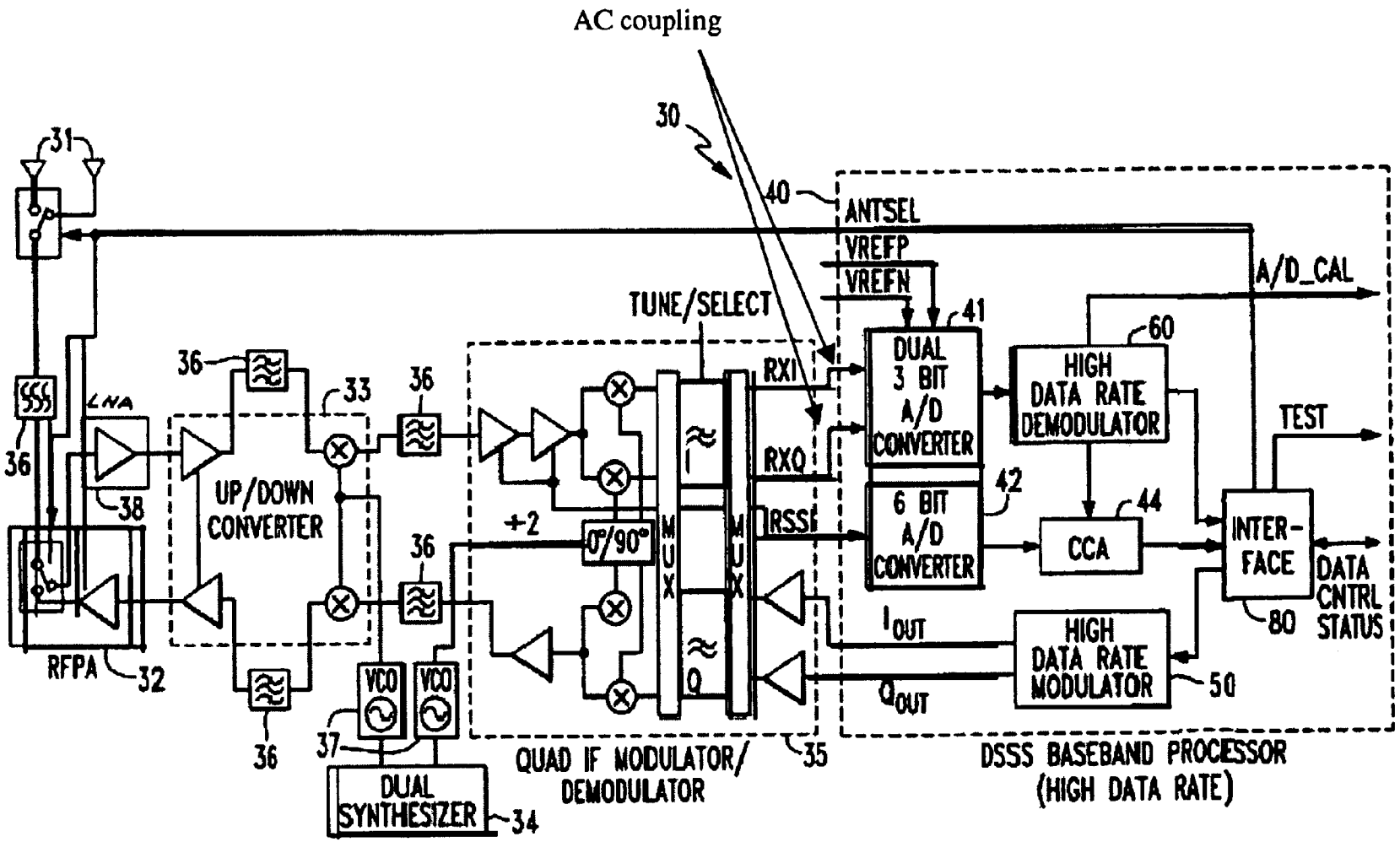
FIG. 1 is a schematic circuit diagram of a transceiver in accordance with the present invention.

Referring to FIG. 1, a wireless transceiver 30 in accordance with the invention is first described. The transceiver 30 may be readily used for WLAN applications in the 2.4 GHz ISM band in accordance with the proposed IEEE 802.11 standard. Those of skill in the art will readily recognize other applications for the transceiver 30 as well. The transceiver 30 includes the selectable antennas 31 coupled to the radio power amplifier and TX/RX switch 32 as may be provided by a Harris part number HFA3925. As would be readily understood by those skilled in the art, multiple antennas may be provided for space diversity reception.

A low noise amplifier 38, as may be provided by Harris part number HFA3424, is also operatively connected to the antennas. The illustrated up/down converter 33 is connected to both the low noise amplifier 38 and the RF power amplifier and TX/RX switch 32 as would be readily understood by those skilled in the art. The up/down converter 33 may be provided by a Harris part number HFA3624, for example. The up/down converter 33, in turn, is connected to the illustrated dual frequency synthesizer 34 and the quad IF modulator/demodulator 35. The dual synthesizer 34 may be a Harris part number HFA3524 and the quad IF modulator 35 may be a Harris part number HFA3724. All the components described so far are included in a 2.4 GHz direct sequence spread spectrum wireless transceiver chip set manufactured by Harris Corporation under the designation PRISM 1. Various filters 36, and the illustrated voltage controlled oscillators 37 may also be provided as would be readily understood by those skilled in the art and as further described in the Harris PRISM 1 chip set literature, such as the application note No. AN9614, March 1996, the entire disclosure of which is incorporated herein by reference.

Turning now more particularly to the right hand side of FIG. 1, the high data rate direct sequence spread spectrum (DSS) baseband processor 40 in accordance with the present invention is now described. The conventional Harris PRISM 1 chip set includes a low data rate DSS baseband processor available under the designation HSP3824. This prior baseband processor is described in detail in a publication entitled "Direct Sequence Spread Spectrum Baseband Processor, March 1996, file number 4064.4, and the entire disclosure of which is incorporated herein by reference.

Like the HSP3824 baseband processor, the high data rate baseband processor 40 of the invention contains all of the functions necessary for a full or half duplex packet baseband transceiver. The processor 40 has on-board dual 3-bit A/D converters 41 for receiving the receive I and Q signals from the quad IF modulator 35. Also like the HSP3824, the high data rate processor 40 includes a receive signal strength indicator (RSSI) monitoring function with the on-board 6-bit A/D converter and CCA circuit block 44 provides a clear channel assessment (CCA) to avoid data collisions and optimize network throughput as would be readily understood by those skilled in the art.

The present invention provides an extension of the PRISM 1 product from 1 Mbit/s BPSK and 2 Mbit/s QPSK to 5.5 Mbit/s BPSK and 11 Mbit/s QPSK. This is accomplished by keeping the chip rate constant at 11 Mchip/s. This allows the same RF circuits to be used for higher data rates. The symbol rate of the high rate mode is 11 MHz/8=1.375 Msymbol/s.

For the 5.5 Mbit/s mode of the present invention, the bits are scrambled and then encoded from 4 bit nibbles to 8 chip modified Walsh functions. This mapping results in bi-orthogonal codes which have a better bit error rate (BER) performance than BPSK alone. The resulting 11 Mchip/s data stream is BPSK modulated. The demodulator comprises a modified Walsh correlator and associated chip tracking, carrier tracking, and reformatting devices as described in greater detail below.

For the 11 Mbit/s mode, the bits are scrambled and then encoded from 4 bit nibbles to 8 chip modified Walsh functions independently on each I and Q rail. There are 8 information bits per symbol mapped to 2 modified Walsh functions. This mapping results in bi-orthogonal codes which have better BER performance than QPSK alone. The resulting two 11 Mchip/s data streams are QPSK modulated.

The theoretical BER performance of this type of modulation is approximately $10^{-5}$ at an Eb/No of 8 dB versus 9.6 dB for plain BPSK or QPSK. This coding gain is due to the bi-orthogonal coding. There is bandwidth expansion for all of the modulations to help combat multi-path and reduce the effects of interference.

Figure 2:
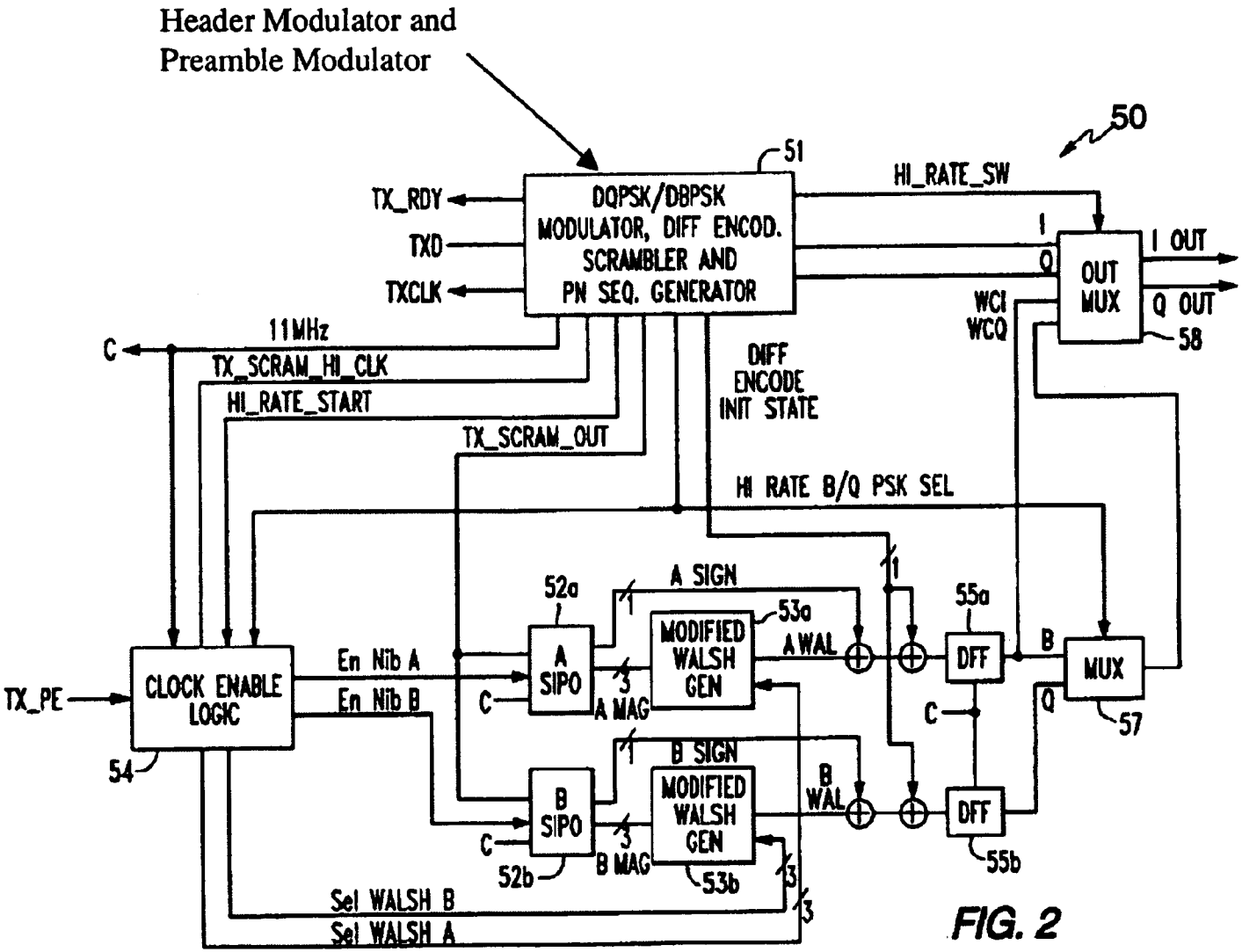
FIG. 2 is a schematic circuit diagram of a modulator portion of the high data rate baseband processor in accordance with the present invention.

Referring additionally to FIG. 2, the output of the QPSK/BPSK modulator and scrambler circuit 51 is partitioned into nibbles of Sign-Magnitude of 4 bits, with the least significant bit (LSB) first. For QPSK, 2 nibbles are presented in parallel to the Modified Walsh Generators 53a, 53b—the first nibble from the B serial-in/parallel-out SIPO circuit block 52b and the second from A SIPO 52a. The two nibbles form a symbol of data. The bit rate may be 11 Mbit/s as illustrated. Therefore, the symbol rate is 1.375 Mbit/s (11/8=1.375). For BPSK, nibbles are presented from the A SIPO 52a only. The B SIPO 52b is disabled. A nibble forms a symbol of data. The bit rate in this instance is 5.5 Mbit/s and the symbol rate remains 1.375 Mbit/s (5.5/4=1.375).

The Magnitude part of the SIPO output points to one of the Modified Walsh Sequences shown in the table below, along with the basic Walsh sequences for comparison.

| MAG | BASIC WALSH | MODIFIED WALSH |
|---|---|---|
| 0 | 00 | 03 |
| 1 | 0F | 0C |
| 2 | 33 | 30 |
| 3 | 3C | 3F |
| 4 | 55 | 56 |
| 5 | 5A | 59 |
| 6 | 66 | 65 |
| 7 | 69 | 6A. |

The Sel Walsh A,, and Sel Walsh B bits from the clock enable logic circuit 54 multiplex the selected Walsh sequence to the output, and wherein the LSBs are output first. The A Sign and B Sign bits bypass the respective Modified Walsh Generators 53a, 53b and are XOR'd to the sequence.

As would be readily understood by those skilled in the art, there are other possible mappings of bits to Walsh symbols that are contemplated by the present invention. In addition, the Modified Walsh code may be generated by modulo two adding a fixed hexadecimal code to the basic or standard Walsh codes to thereby reduce the average DC signal component and thereby enhance overall performance as will be explained in greater detail below.

The output of the Diff encoders of the last symbol of the header CRC is the reference for the high rate data. The header may always be BPSK. This reference is XOR'd to I and Q signals before the output. This allows the demodulator 60, as described in greater detail below, to compensate for phase ambiguity without Diff decoding the high rate data. Data flip flops 55a, 55b are connected to the multiplexer, although in other embodiments the flip flops may be positioned further downstream as would be readily understood by those skilled in the art. The output chip rate is 11 Mchip/s. For BPSK, the same chip sequence is output on each I and Q rail via the multiplexer 57. The output multiplexer 58 provides the selection of the appropriate data rate and format.

Figure 3:
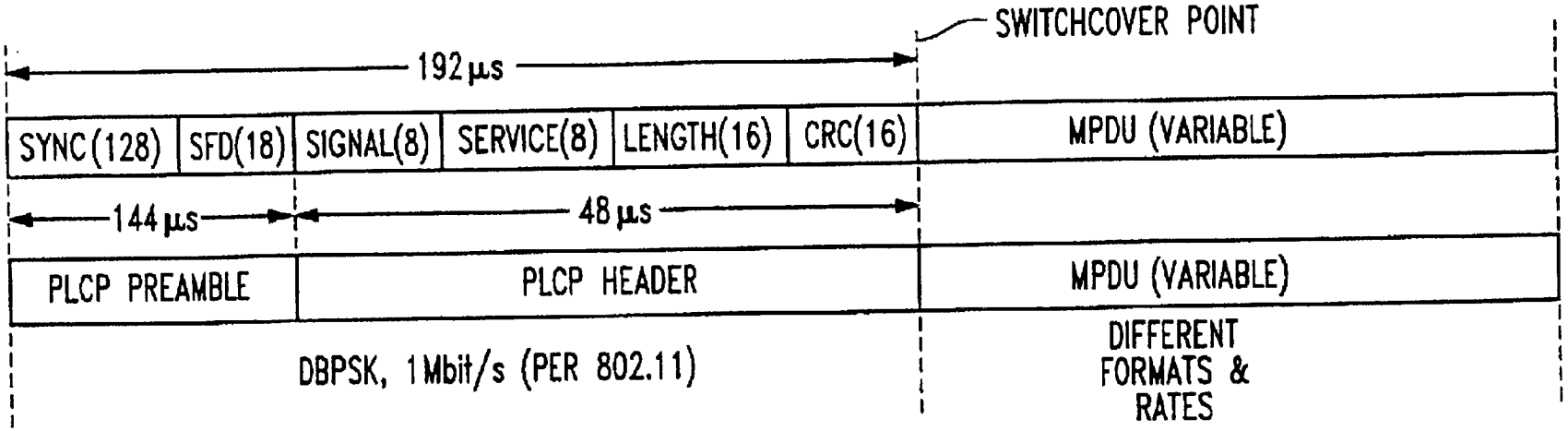
FIG. 3 is a timing diagram of signals generated by the present invention.

Referring now additionally to FIG. 3, the timing and signal format for the interface 80 is described in greater detail. Referring to the left hand portion, Sync is all 1's, and SFD is F3AOh for the PLCP preamble 90. Now relating to the PLCP header 91, the SIGNAL is:

| | |
|---|---|
| 0Ah | 1 Mbit/s BPSK, |
| 14h | 2 Mbit/S QPSK, |
| 37h | 5.5 Mbit/s BPSK, and |
| 6Eh | 11 Mbit/s QPSK. |

The SERVICE is OOh, the LENGTH is XXXXh wherein the length is in μs, and the CRC is XXXXh calculated based on SIGNAL, SERVICE and LENGTH. MPDU is variable with a number of octets (bytes).

The PLCP preamble and PLCP header are always at 1 Mbit/s, Diff encoded, scrambled and spread with an 11 chip barker. SYNC and SFD are internally generated. SIGNAL, SERVICE and LENGTH fields are provided by the interface 80 via a control port. SIGNAL is indicated by 2 control bits and then formatted as described. The interface 80 provides the LENGTH in μs. CRC in PLCP header is performed on SIGNAL, SERVICE and LENGTH fields.

MPDU is serially provided by Interface 80 and is the variable data scrambled for normal operation. The reference phase for the first symbol of the MPDU is the output phase of the last symbol of the header for Diff Encoding. The last symbol of the header into the scrambler 51 must be followed by the first bit of the MPDU. The variable data may be modulated and demodulated in different formats than the header portion to thereby increase the data rate, and while a switchover as indicated by the switchover point in FIG. 3, occurs on-the-fly.

Figure 4:
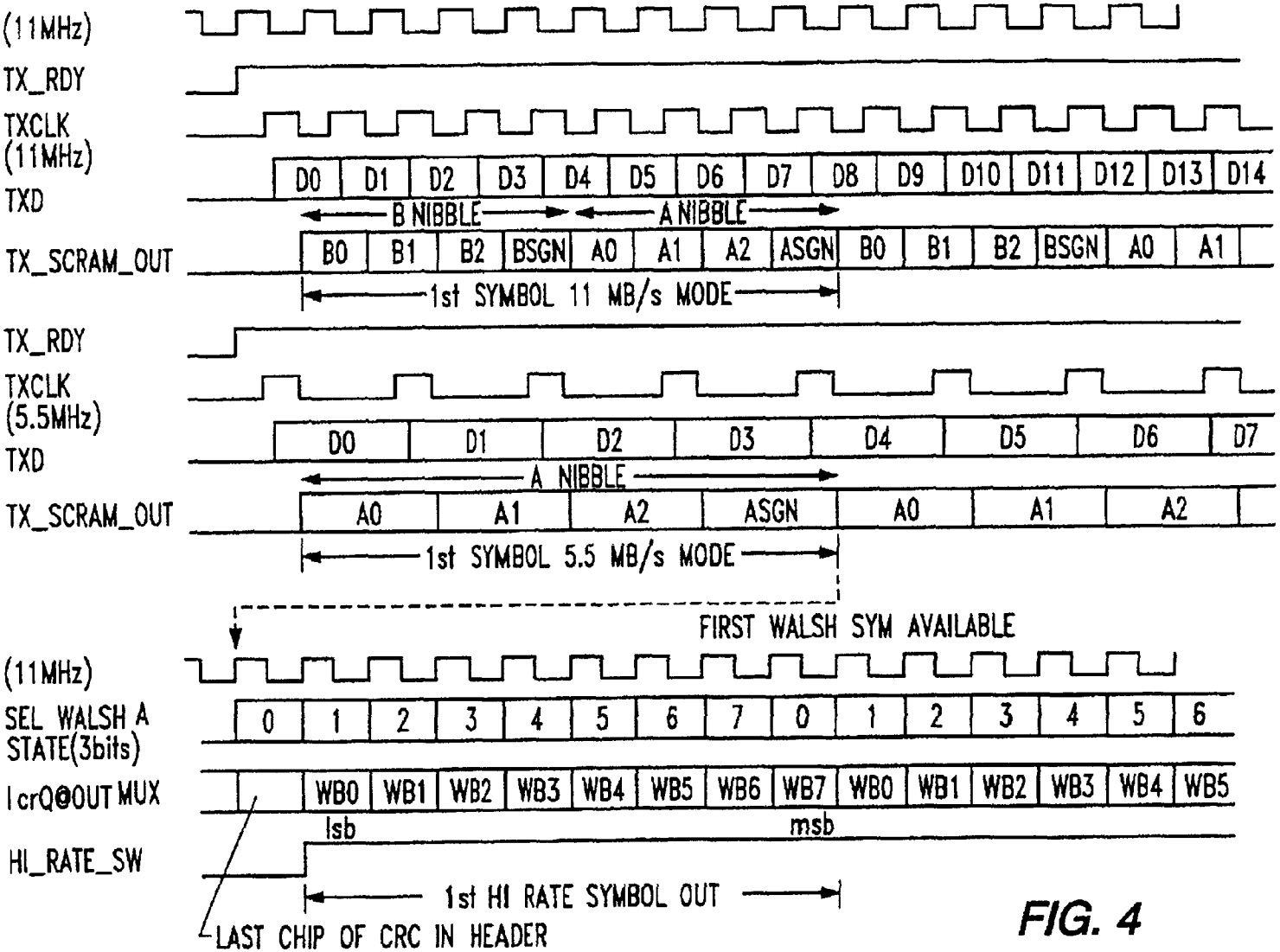
FIG. 4 is a timing diagram of additional signals generated by the present invention.

Turning now additionally to FIG. 4, the timing of the high data rate modulator 50 may be further understood. With the illustrated timing, the delay from TX_RDY to the first Hi Rate Output Chip is ten 11 MHz clock periods or 909.1 ns. The other illustrated quantities will be readily appreciated in view of the above description.

Figure 5:
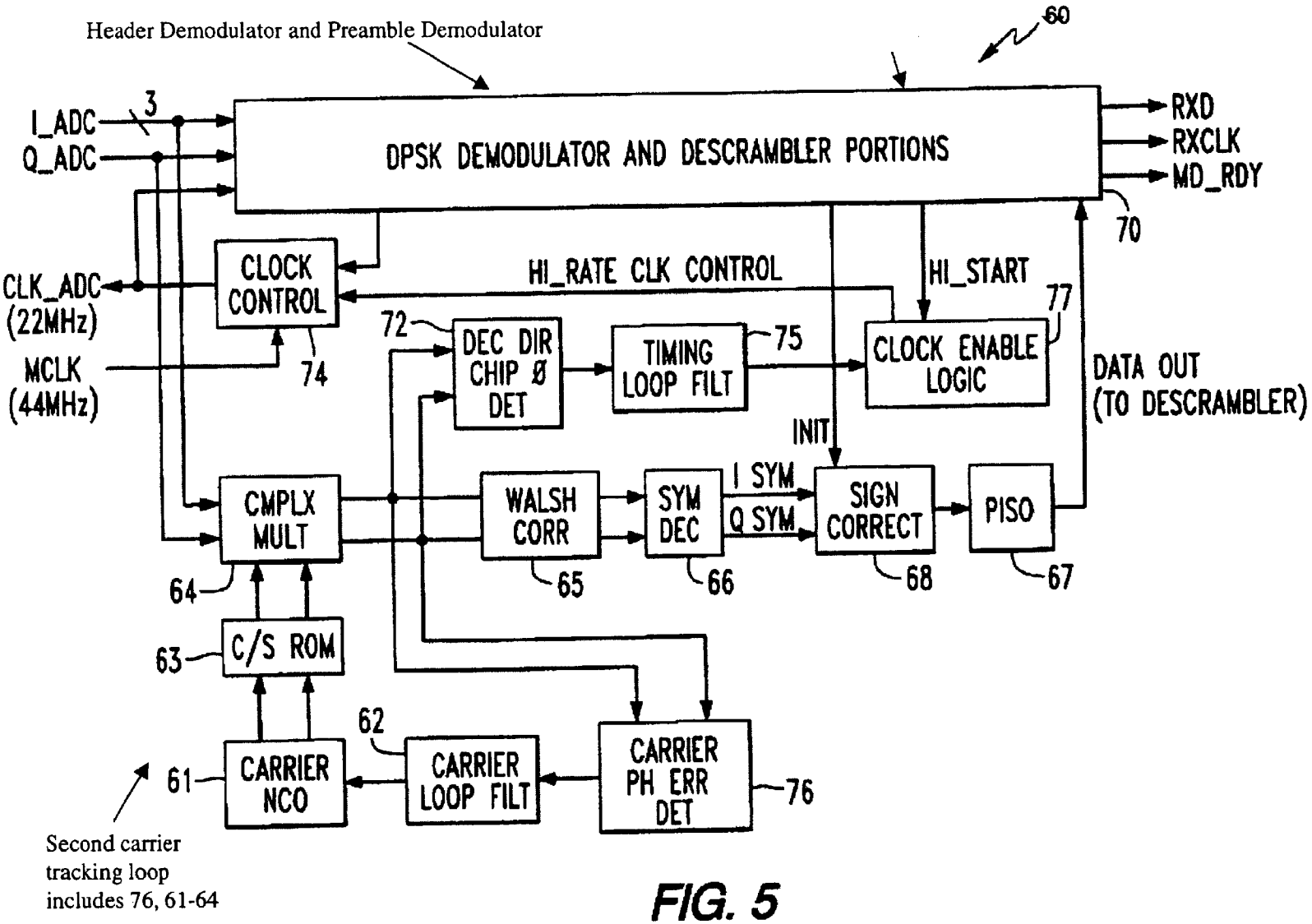
FIG. 5 is a schematic circuit diagram of a demodulator portion of the high data rate baseband processor in accordance with the present invention.

Referring now to FIG. 5, the high data rate demodulator 60 in accordance with the invention is further described. The high rate circuits are activated after the signal field indicates 5.5 or 11 Mbit/s operation. At a certain time, the start phase is jammed into the Carrier NCO 61 and the start frequency offset is jammed into the Carrier Loop Filter 62. The signal is frequency translated by the C/S ROM 63 and the Complex Multiplier 64 and passed to the Walsh Correlator 65. The correlator 65 output drives the Symbol Decision circuits 66, as illustrated. The output of the Symbol Decision circuits 66 are serially shifted by the parallel-in/serial-out SIPO block 67 to the descrambler portion of the PSK Demodulator and Scrambler circuit 70 after passing through the Sign Correction circuit 68 based on the last symbol of the header. The timing of the switch over desirably makes the symbol decisions ready at the correct time.

The signal is phase and frequency tracked via the Complex Multiplier 64, Carrier NCO 61 and Carrier Loop Filter 62. The output of the Complex Multiplier 64 also feeds the Carrier Phase Error Detector 76. A decision directed Chip Phase Error Detector 72 feeds the illustrated Timing Loop Filter 75 which, in turn, is connected to the Clock Enable Logic 77. A decision from the Chip Phase Error Detector 72 is used instead of early-late correlations for chip tracking since the SNR is high. This greatly reduces the additional circuitry required for high rate operation. The 44 MHz master clock input to the Clock Control 74 will allow tracking high rate mode chips with ±⅛ chip steps. Only the stepper is required to run at 44 MHz, while most of the remaining circuits run at 11 MHz. The circuit is only required to operate with a long header and sync.

Figure 6:
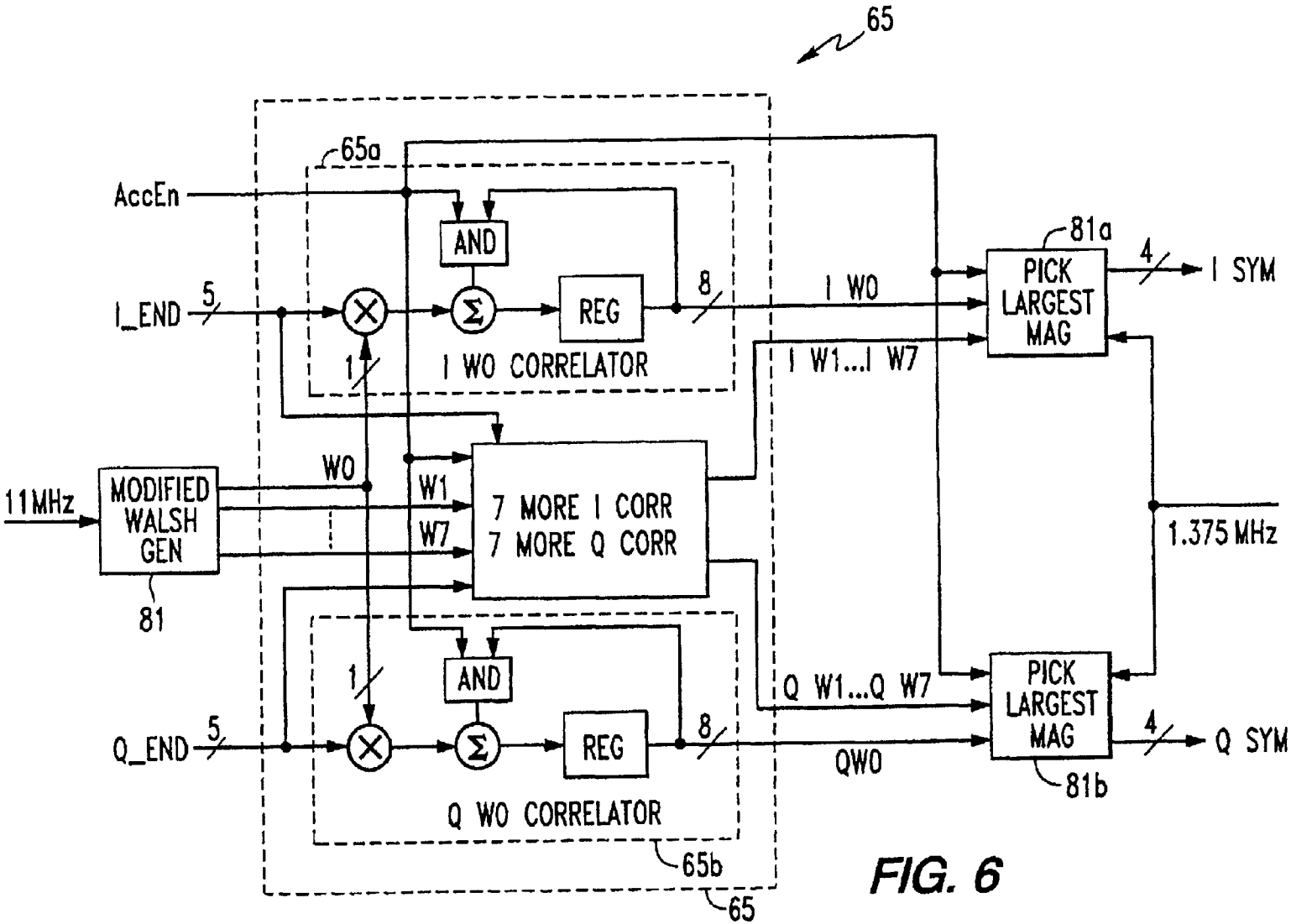
FIG. 6 is a schematic circuit diagram of the correlator portion of the demodulator of the high data rate baseband processor in accordance with the present invention.

Turning now additionally to FIG. 6, a pair of Walsh Correlators 65a, 65b is further described. The I_END and Q_END inputs from the chip tracking loop are input at 11 MHz. The Modified Walsh Generator 81 produces the 8 Walsh codes (W0 to W7) serially to sixteen parallel correlators (8 for I_END and 8 for Q_END). The sixteen correlations are available at a 1.375 MHz rate. The Walsh Codes (W0 to W7) are the same as listed in the table above for the high data rate modulator. For the 11 Mbit/s mode, the largest magnitude of I W0 to I W7 is selected by the Pick Largest Magnitude circuit 81a to form I sym. I sym is formatted in Sign-Magnitude. The Magnitude is the Modified Walsh Index (0 to 7) of the largest Correlation and Sign is the sign bit of the input of the winning Correlation. The Q channel is processed in parallel in the same manner. For the 5.5 Mbit/s mode, the largest magnitude of I W0 to I W7 is selected to form Isym. In this case, only I sym is output. AccEn controls the correlator timing and is supplied by timing and control circuits.

Figure 7:
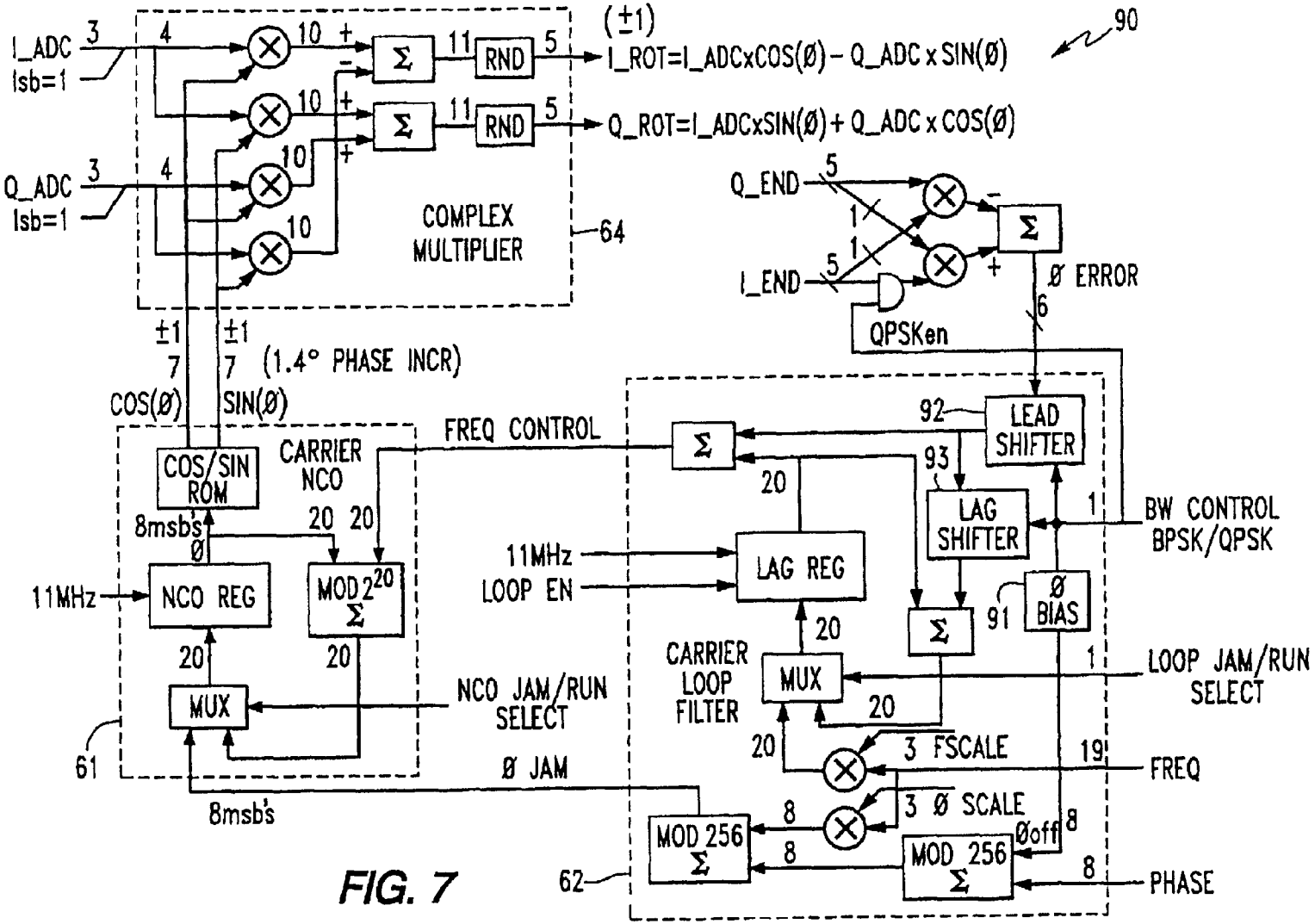
FIG. 7 is a schematic circuit diagram of additional portions of the demodulator of the high data rate baseband processor in accordance with the present invention.

With additional reference to FIG. 7, the carrier tracking loop 90 is now described. In the described embodiment, the number of bits are worst case for estimation purposes. While 3 bits are used for the A/D conversion, a higher number may be desired in other embodiments as would be readily appreciated by those skilled in the art. The Phase BIAS circuit 91 compensates for constellation rotation, that is, BPSK or QPSK. FSCALE compensates for the NCO clock frequency. PHASE SCALE compensates for a phase shift due to frequency offset over the time difference of the first and second loops. The Lead and Lag Shifters 92, 93 form the loop multiplier for the second order carrier tracking loop filter 62.

Figure 8:
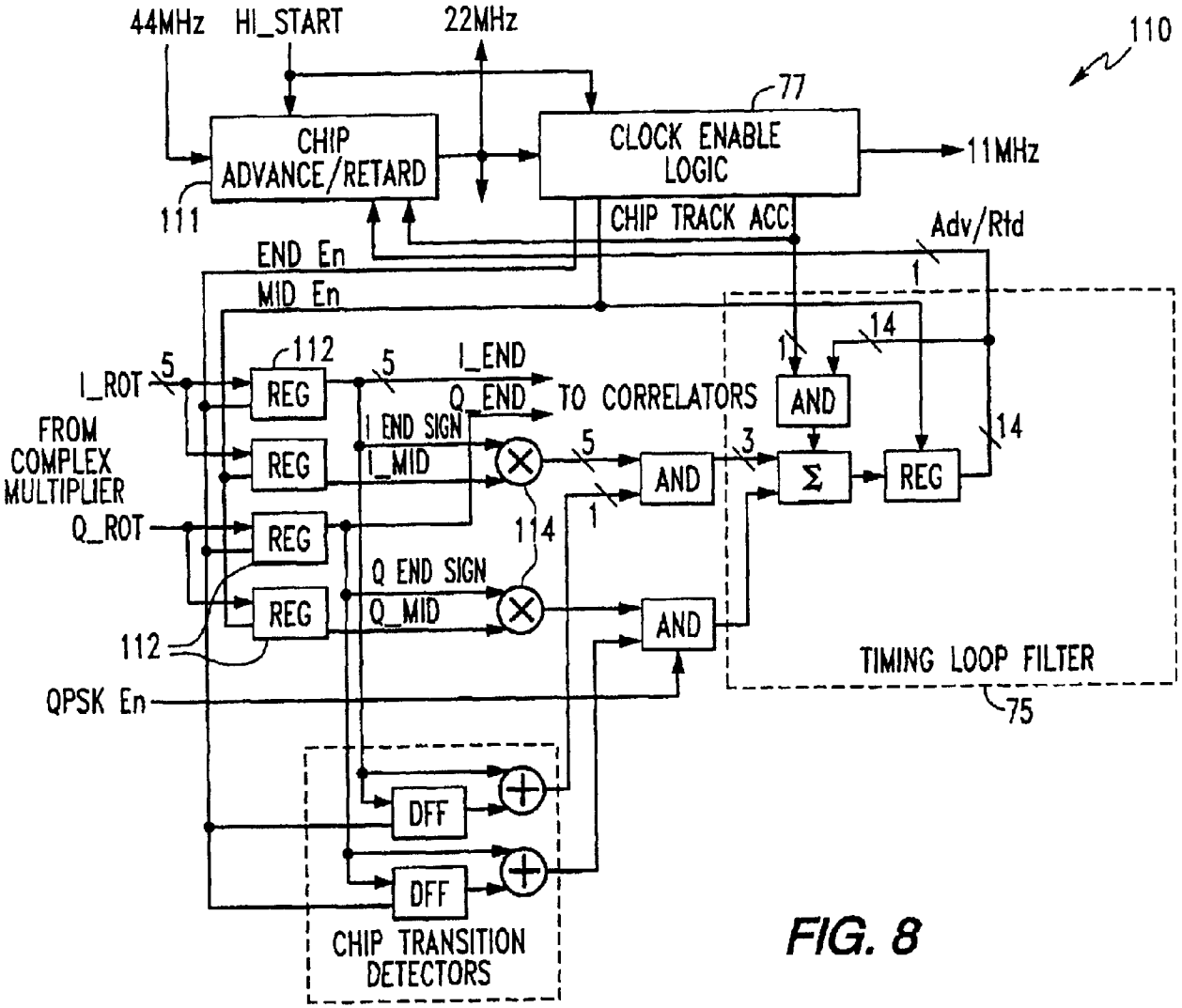
FIG. 8 is a schematic circuit diagram of further portions of the demodulator of the high data rate baseband processor in accordance with the present invention.

Referring now additionally to FIG. 8, the Chip Tracking Loop 110 is further described. All circuits except Chip Advance/Retard 111 use the 22 MHz clock signal. The Chip Advance/Retard circuit 111 may be made to integrate with the existing clock of the prior art PRISM 1 circuit. PRISM 1 steps in ±¼ chips. The PRISM 1 timing may be changed to switchover this circuit for high data rate operation. The A/D clock switches without a phase shift. I_ROT and Q_ROT are from the Complex Multiplier 64 at 22 MHz. They are sampled by the illustrated Registers 112 to produce I_End and Q_End at 11 MHz, which are routed to the Correlators 65 (FIG. 6). The alternate samples I_Mid and Q_Mid are used to measure the chip phase error. For QPSK, errors are generated from both rails, and for BPSK, the error is only generated from the I rail. QPSK En disables the Q rail phase error for BPSK operation.

The sign of the accumulator is used to advance or retard the chip timing by ⅛ chip. This circuit must be enabled by the PRISM 1 circuits at the proper time via the HI_START signal. The errors are summed and accumulated for 32 symbols (256 chips). The Chip Track Acc signal them dumps the accumulator for the next measurement. The chip phase error is generated if the End Sign bits bracketing the Mid sample are different. This is accomplished using the transition detectors. The sign of the chip phase error is determined by the sign of the End sample after the Mid sample. A multiplier 114 is shown for multiplying by +1 if the End Sign is 0 or by −1 if the End Sign is 1. If the End sign bits are identical, the chip phase error for that rail is 0. The AND function is only enabled by transitions.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A spread spectrum radio transceiver comprising:

a baseband processor and a radio circuit connected thereto, said baseband processor comprising a demodulator for spread spectrum phase shift keying (PSK) demodulating information received from said radio circuit, at least one analog-to-digital (A/D) converter having an output connected to said demodulator and an input AC-coupled to said radio circuit, said demodulator comprising at least one modified Walsh code function correlator for decoding information according to a modified Walsh code *having a reduced DC component for* reducing an average DC signal component [which] *of the information decoded by the modified Walsh code relative to that information being decoded by an unmodified Walsh code which,* in combination with the AC-coupling to said at least one A/D converter enhances overall performance, and a modulator for spread spectrum PSK modulating information for transmission via the radio circuit, said modulator comprising at least one modified Walsh code function encoder for encoding information according to the modified Walsh code.

2. A spread spectrum radio transceiver according to claim 1 wherein said modulator comprises means for operating in one of first format defined by bi-phase PSK (BPSK) modulation at a first data rate and a second format defined by quadrature PSK (QPSK) modulation at a second data rate; and wherein said demodulator comprises means for operating in one of the first and second formats.

3. A spread spectrum radio transceiver according to claim 2 wherein said modulator comprises header modulator means for modulating data packets to include a header at a third format defined by a predetermined modulation at a third data rate and variable data in one of the first and second formats; and wherein said demodulator comprises header demodulator means for demodulating data packets by demodulating the header at the third format and for switching to the respective one of the first and second formats of the variable data after the header.

4. A spread spectrum radio transceiver according to claim 3 wherein the predetermined modulation of the third format is differential BPSK (DBPSK), and wherein the third data rate is lower than the first and second data rates.

5. A spread spectrum radio transceiver according to claim 3 wherein said demodulator further comprises:

a first carrier tracking loop for the third format; and a second carrier tracking loop for the first and second formats.

6. A spread spectrum radio transceiver according to claim 5 wherein said second carrier tracking loop comprises:

a carrier numerically controlled oscillator (NCO); and carrier NCO control means for selectively operating said carrier NCO based upon a carrier phase of said first carrier tracking loop to thereby facilitate switching to the format of the variable data.

7. A spread spectrum radio transceiver according to claim 5 wherein said second carrier tracking loop comprises:

a carrier loop filter; and carrier loop filter control means for selectively operating said carrier loop filter based upon a frequency of said first carrier tracking loop to thereby facilitate switching to the format of the variable data.

8. A spread spectrum radio transceiver according to claim 1 wherein said modulator further comprises means for partitioning data into four bit nibbles of sign (one bit) and magnitude (three bits) to said at least one modified Walsh code function encoder.

9. A spread spectrum radio transceiver according to claim 1 wherein the modified Walsh code is a Walsh code modified by a modulo two addition of a fixed hexadecimal code thereto.

10. A spread spectrum radio transceiver according to claim 1 wherein said at least one modified Walsh code function correlator comprises:

a modified Walsh function generator; and a plurality of parallel connected correlators connected to said modified Walsh function generator.

11. A spread spectrum radio transceiver according to claim 1 wherein said modulator comprises spreading means for spreading each data bit using a pseudorandom (PN) sequence at a predetermined chip rate and preamble modulating means for generating a preamble; and wherein said demodulator comprises preamble demodulator means for demodulating the preamble for achieving initial PN sequence synchronization.

12. A spread spectrum radio transceiver according to claim 1 wherein said modulator comprises a scrambler; and wherein said demodulator comprises a descrambler.

13. A spread spectrum radio transceiver according to claim 1 wherein said demodulator comprises clear channel assessing means for generating a clear channel assessment signal.

14. A spread spectrum radio transceiver according to claim 1 wherein said radio circuit comprises:

a quadrature intermediate frequency modulator/demodulator connected to said baseband processor; and an up/down frequency converter connected to said quadrature intermediate frequency modulator/demodulator.

15. A spread spectrum radio transceiver according to claim 14 wherein said radio circuit further comprises:

a low noise amplifier having an output connected to an input of said up/down converter; and a radio frequency power amplifier having an input connected to an output of said up/down converter.

16. A spread spectrum radio transceiver according to claim 15 further comprising:

an antenna; and an antenna switch for switching said antenna between the output of said radio frequency power amplifier and the input of said low noise amplifier.

17. A baseband processor for a spread spectrum radio transceiver, said baseband processor comprising:

a demodulator for spread spectrum phase shift keying (PSK) demodulating;

at least one analog-to-digital (A/D) converter having an output connected to said demodulator and an input AC-coupled to receive information;

said demodulator comprising at least one predetermined orthogonal code function correlator for decoding information according to a predetermined orthogonal code, *wherein the predetermined orthogonal code is modified to have a reduced DC component for* reducing an average DC signal component [to thereby increase] *of the information decoded by the predetermined orthogonal code relative to that information being decoded by the predetermined orthogonal code in its unmodified state to thereby promote* AC-coupling to said at least one A/D converter; and a modulator for spread spectrum PSK modulating information for transmission, said modulator comprising at least one predetermined orthogonal code function encoder for encoding information according to the predetermined orthogonal code.

18. A baseband processor according to claim 17 wherein said modulator comprises means for operating in one of first format defined by bi-phase PSK (BPSK) modulation at a first data rate and a second format defined by quadrature PSK (QPSK) modulation at a second data rate; and wherein said demodulator comprises means for operating in one of the first and second formats.

19. A baseband processor according to claim 18 wherein said modulator comprises header modulator means for modulating data packets to include a header at a third format defined by a predetermined modulation at a third data rate and variable data in one of the first and second formats; and wherein said demodulator comprises header demodulator means for demodulating data packets by demodulating the header at the third format and for switching to the respective one of the first and second formats of the variable data after the header.

20. A baseband processor according to claim 19 wherein the predetermined modulation of the third format is differential BPSK (DBPSK), and wherein the third data rate is lower than the first and second data rates.

21. A baseband processor according to claim 19 wherein said demodulator further comprises:

a first carrier tracking loop for the third format; and a second carrier tracking loop for the first and second formats.

22. A baseband processor according to claim 21 wherein said second carrier tracking loop comprises:

a carrier numerically controlled oscillator (NCO); and carrier NCO control means for selectively operating said carrier NCO based upon a carrier phase of said first carrier tracking loop to thereby facilitate switching to the format of the variable data.

23. A baseband processor according to claim 21 wherein said second carrier tracking loop comprises:

a carrier loop filter; and carrier loop filter control means for selectively operating said carrier loop filter based upon a frequency of said first carrier tracking loop to thereby facilitate switching to the format of the variable data.

24. A baseband processor according to claim 17 wherein said modulator further comprises means for partitioning data into four bit nibbles of sign (one bit) and magnitude (three bits) to said at least one predetermined orthogonal code function encoder.

25. A baseband processor according to claim 17 wherein the predetermined orthogonal code is a Walsh code modified by a modulo two addition of a fixed hexadecimal code thereto.

26. A baseband processor according to claim 17 wherein the predetermined orthogonal code is a bi-orthogonal code.

27. A baseband processor according to claim 17 wherein said at least one predetermined orthogonal code function correlator comprises:

a predetermined orthogonal code function generator; and a plurality of parallel connected correlators connected to said predetermined orthogonal code function generator.

28. A baseband processor according to claim 17 wherein said modulator comprises spreading means for spreading each data bit using a pseudorandom (PN) sequence at a predetermined chip rate and preamble modulating means for generating a preamble; and wherein said demodulator comprises preamble demodulator means for demodulating the preamble for achieving initial PN sequence synchronization.

29. A baseband processor according to claim 17 wherein said modulator comprises a scrambler; and wherein said demodulator comprises a descrambler.

30. A baseband processor for a spread spectrum radio transceiver, said baseband processor comprising:

a modulator for spread spectrum phase shift keying (PSK) modulating information for transmission, said modulator comprising at least one encoder for encoding information for transmission, means for operating in one of a first format defined by bi-phase PSK (BPSK) modulation at a first data rate and a second format defined by quadrature PSK (QPSK) modulation at a second data rate, header modulator means for modulating data packets to include a header at a third format defined by a predetermined modulation at a third data rate and variable data in one of the first and second formats; and a demodulator for spread spectrum PSK demodulating received information, said demodulator comprising at least one correlator for decoding received information, means for operating in one of the first and second formats, header demodulator means for demodulating data packets by demodulating the header at the third format and for switching to the respective one of the first and second formats of the variable data after the header, a first carrier tracking loop for the third format, and a second carrier tracking loop for the first and second formats.

31. A baseband processor according to claim 30 wherein the predetermined modulation of the third format is differential BPSK (DBPSK), and wherein the third data rate is lower than the first and second data rates.

32. A baseband processor according to claim 30 wherein said second carrier tracking loop comprises:

a carrier numerically controlled oscillator (NCO); and carrier NCO control means for selectively operating said carrier NCO based upon a carrier phase of said first carrier tracking loop to thereby facilitate switching to the format of the variable data.

33. A baseband processor according to claim 30 wherein said second carrier tracking loop comprises:

a carrier loop filter; and carrier loop filter control means for selectively operating said carrier loop filter based upon a frequency of said first carrier tracking loop to thereby facilitate switching to the format of the variable data.

34. A baseband processor according to claim 30 wherein said modulator comprises spreading means for spreading each data bit using a pseudorandom (PN) sequence at a predetermined chip rate and preamble modulating means for generating a preamble; and wherein said demodulator comprises preamble demodulator means for demodulating the preamble for achieving initial PN sequence synchronization.

35. A baseband processor according to claim 30 wherein said modulator comprises a scrambler; and wherein said demodulator comprises a descrambler.

36. A modulator for a spread spectrum radio transceiver, said modulator comprising:

modulator means for spread spectrum phase shift keying (PSK) modulating information for transmission, said modulator means comprising at least one predetermined orthogonal code function encoder for encoding information according to a predetermined orthogonal code, *wherein the predetermined orthogonal code is modified to have a reduced DC component* for reducing an average DC signal component *of the information*

*encoded by the predetermined orthogonal code relative to that information being encoded by the predetermined orthogonal code in its unmodified state.*

37. A modulator according to claim 36 wherein said modulator means comprises means for operating in one of first format defined by bi-phase PSK (BPSK) modulation at a first data rate and a second format defined by quadrature PSK (QPSK) modulation at a second data rate.

38. A modulator according to claim 37 wherein said modulator means comprises header modulator means for modulating data packets to include a header at a third format defined by a predetermined modulation at a third data rate and variable data in one of the first and second formats.

39. A modulator according to claim 38 wherein the predetermined modulation of the third format is differential BPSK (DBPSK), and wherein the third data rate is lower than the first and second data rates.

40. A modulator according to claim 36 wherein said modulator means further comprises means for partitioning data into four bit nibbles of sign (one bit) and magnitude (three bits) to said at least one predetermined orthogonal code function encoder, and wherein the predetermined orthogonal code is a Walsh code modified by a modulo two addition of a fixed hexadecimal code thereto.

41. A modulator according to claim 36 wherein said at least one predetermined orthogonal code function correlator comprises:

a predetermined orthogonal code function generator; and a plurality of parallel connected correlators connected to said predetermined orthogonal code function generator.

42. A modulator according to claim 36 wherein the predetermined orthogonal code is a Walsh code modified by a modulo two addition of a fixed hexadecimal code thereto.

43. A modulator according to claim 36 wherein the predetermined orthogonal code is a bi-orthogonal code.

44. A demodulator for a spread spectrum radio transceiver, said demodulator comprising:

demodulator means for spread spectrum phase shift keying (PSK) demodulating information received from [said] *a* radio circuit, said demodulator means comprising at least one predetermined orthogonal code function correlator for decoding information according to a predetermined orthogonal code*, wherein the predetermined orthogonal code is modified to have a reduced DC signal component for* reducing an average DC signal component *of the information decoded by the predetermined orthogonal code relative to that information being decoded by the predetermined orthogonal code in its unmodified state.*

45. A demodulator according to claim 44 wherein said demodulator means comprises means for operating in one of first format defined by bi-phase PSK (BPSK) modulation at a first data rate and a second format defined by quadrature PSK (QPSK) modulation at a second data rate.

46. A demodulator according to claim 45 wherein said demodulator means comprises header demodulator means for demodulating data packets including a header in a third format defined by a predetermined modulation at a third data rate and variable data in one of the first and second formats, and for switching to the respective one of the first and second formats of the variable data after the header.

47. A demodulator according to claim 46 wherein the predetermined modulation of the third format is differential BPSK (DBPSK), and wherein the third data rate is lower than the first and second data rates.

48. A demodulator according to claim 46 wherein said demodulator means further comprises:

a first carrier tracking loop for the third format; and a second carrier tracking loop for the first and second formats.

49. A demodulator according to claim 48 wherein said second carrier tracking loop comprises:

a carrier numerically controlled oscillator (NCO); and carrier NCO control means for selectively operating said carrier NCO based upon a carrier phase of said first carrier tracking loop to thereby facilitate switching to the format of the variable data.

50. A demodulator according to claim 48 wherein said second carrier tracking loop comprises:

a carrier loop filter; and carrier loop filter control means for selectively operating said carrier loop filter based upon a frequency of said first carrier tracking loop to thereby facilitate switching to the format of the variable data.

51. A demodulator according to claim 44 further comprising means for partitioning data into four bit nibbles of sign (one bit) and magnitude (three bits).

52. A demodulator according to claim 44 wherein the predetermined orthogonal code is a Walsh code modified by a modulo two addition of a fixed hexadecimal code thereto.

53. A demodulator according to claim 44 wherein the predetermined orthogonal code is a bi-orthogonal code.

54. A demodulator according to claim 44 wherein said at least one predetermined orthogonal code function correlator comprises:

a predetermined orthogonal code function generator; and a plurality of parallel connected correlators connected to said predetermined orthogonal code function generator.

55. A method for baseband processor for spread spectrum radio communication, the method comprising the steps of:

spread spectrum phase shift keying (PSK) modulating information for transmission while encoding the information according to *a predetermined orthogonal code, wherein* the predetermined orthogonal code *is modified to have a reduced DC component* for reducing an average DC signal component *of the information encoded by the predetermined orthogonal code relative to that information being encoded by the predetermined orthogonal code in its unmodified state*; and spread spectrum PSK demodulating received information by decoding the received information according to the predetermined orthogonal code.

56. A method according to claim 55 further comprising the step of AC-coupling received information for spread spectrum PSK demodulating so that the reduced average DC signal component in combination with the AC-coupling enhances overall performance.

57. A method according to claim 55 further comprising the steps of modulating and demodulating in one of first format defined by bi-phase PSK (BPSK) modulation at a first data rate and a second format defined by quadrature PSK (QPSK) modulation at a second data rate.

58. A method according to claim 57 further comprising the steps of:

modulating data packets to include a header at a third format defined by a predetermined modulation at a third data rate and variable data in one of the first and second formats; and demodulating data packets by demodulating the header at the third format and for switching to the respective one of the first and second formats of the variable data after the header.

59. A method according to claim 58 wherein the predetermined modulation of the third format is differential BPSK (DBPSK), and wherein the third data rate is lower than the first and second data rates.

60. A method according to claim 55 wherein the predetermined orthogonal code is a Walsh code modified by a modulo two addition of a fixed hexadecimal code thereto.

61. A method according to claim 55 wherein the predetermined orthogonal code is a bi-orthogonal code.

*62. A spread spectrum radio transceiver comprising:*

*a baseband processor and a radio circuit coupled thereto, said baseband processor comprising a demodulator for spread spectrum phase shift keying (PSK) demodulating information received from said radio circuit, at least one analog-to-digital (A/D) converter having an output coupled to said demodulator and an input AC-coupled to said radio circuit, said demodulator comprising at least one modified Walsh code function correlator for decoding information according to a modified Walsh code having a reduced DC component relative to an unmodified Walsh code for reducing an average DC signal component of the information decoded by the modified Walsh code relative to that information being decoded by the Walsh code in its unmodified state, and a modulator for spread spectrum PSK modulating information for transmission via the radio circuit, said modulator comprising at least one modified Walsh code function encoder for encoding information according to the modified Walsh code.*

*63. A spread spectrum radio transceiver according to claim 62 wherein said modulator is configured to operate in one of first format defined by bi-phase PSK (BPSK) modulation at a first data rate and a second format defined by quadrature PSK (QPSK) modulation at a second data rate; and wherein said demodulator is configured to operate in one of the first and second formats.*

*64. A spread spectrum radio transceiver according to claim 63 wherein said modulator is configured to modulate data packets to include a header in a third format defined by a modulation at a third data rate and variable data in one of the first and second formats; and wherein said demodulator is configured to demodulate data packets by demodulating the header in the third format and for switching to the respective one of the first and second formats of the variable data after the header.*

*65. A spread spectrum radio transceiver according to claim 64 wherein the modulation of the third format is differential BPSK (DBPSK), and wherein the third data rate is lower than the first and second data rates.*

*66. A spread spectrum radio transceiver according to claim 64 wherein said demodulator further comprises:*

*a first carrier tracking loop for the third format; and*

*a second carrier tracking loop for the first and second formats.*

*67. A spread spectrum radio transceiver according to claim 66 wherein said second carrier tracking loop comprises:*

*a carrier numerically controlled oscillator (NCO); and*

*a controller to selectively operate said carrier NCO based upon a carrier phase of said first carrier tracking loop to thereby facilitate switching to the format of the variable data.*

*68. A spread spectrum radio transceiver according to claim 66 wherein said second carrier tracking loop comprises:*

*a carrier loop filter; and*

*a controller to selectively operate said carrier loop filter based upon a frequency of said first carrier tracking loop to thereby facilitate switching to the format of the variable data.*

*69. A spread spectrum radio transceiver according to claim 62 wherein said modulator is further configured to partition data into four bit nibbles of sign (one bit) and magnitude (three bits) to said at least one modified Walsh code function encoder.*

*70. A spread spectrum radio transceiver according to claim 62 wherein the modified Walsh code is a Walsh code modified by a modulo two addition of a fixed hexadecimal code thereto.*

*71. A spread spectrum radio transceiver according to claim 62 wherein said at least one modified Walsh code function correlator comprises:*

*a modified Walsh function generator; and*

*a plurality of parallel coupled correlators coupled to said modified Walsh function generator.*

*72. A spread spectrum radio transceiver according to claim 62 wherein said modulator is configured to spread each data bit using a pseudorandom (PN) sequence at a chip rate and is configured to generate a preamble; and wherein said demodulator is configured to demodulate the preamble for achieving initial PN sequence synchronization.*

*73. A spread spectrum radio transceiver according to claim 62 wherein said modulator comprises a scrambler; and wherein said demodulator comprises a descrambler.*

*74. A spread spectrum radio transceiver according to claim 62 wherein said demodulator is configured to generate a clear channel assessment signal.*

*75. A spread spectrum radio transceiver according to claim 62 wherein said radio circuit comprises:*

*a quadrature intermediate frequency modulator/demodulator coupled to said baseband processor; and*

*an up/down frequency converter coupled to said quadrature intermediate frequency modulator/demodulator.*

*76. A spread spectrum radio transceiver according to claim 75 wherein said radio circuit further comprises:*

*a low noise amplifier having an output coupled to an input of said up/down converter; and*

*a radio frequency power amplifier having an input coupled to an output of said up/down converter.*

*77. A spread spectrum radio transceiver according to claim 76 further comprising:*

*an antenna; and*

*an antenna switch for switching said antenna between the output of said radio frequency power amplifier and the input of said low noise amplifier.*

*78. A baseband processor for a spread spectrum radio transceiver, said baseband processor comprising:*

*a demodulator for spread spectrum phase shift keying (PSK) demodulating;*

*at least one analog-to-digital (A/D) converter having an output coupled to said demodulator and an input AC-coupled to receive information;*

*said demodulator comprising at least one orthogonal code function correlator for decoding information according to an orthogonal code, wherein the orthogonal code is modified to have a reduced DC component for reducing an average DC signal component of the information decoded by the orthogonal code relative to that information being decoded by the orthogonal code in its unmodified state to thereby promote AC-coupling to said at least one A/D converter; and*

*a modulator for spread spectrum PSK modulating information for transmission, said modulator comprising at least one orthogonal code function encoder for encoding information according to the orthogonal code.*

*79. A baseband processor according to claim 78 wherein said modulator is configured to operate in one of first format defined by bi-phase PSK (BPSK) modulation at a first data rate and a second format defined by quadrature PSK (QPSK) modulation at a second data rate; and wherein said demodulator is configured to operate in one of the first and second formats.*

*80. A baseband processor according to claim 79 wherein said modulator is configured to modulate data packets to include a header in a third format defined by a modulation at a third data rate and variable data in one of the first and second formats; and wherein said demodulator comprises is configured to demodulate data packets by demodulating the header in the third format and for switching to the respective one of the first and second formats of the variable data after the header.*

*81. A baseband processor according to claim 80 wherein the modulation of the third format is differential BPSK (DBPSK), and wherein the third data rate is lower than the first and second data rates.*

*82. A baseband processor according to claim 80 wherein said demodulator further comprises:*

*a first carrier tracking loop for the third format; and*

*a second carrier tracking loop for the first and second formats.*

*83. A baseband processor according to claim 82 wherein said second carrier tracking loop comprises:*

*a carrier numerically controlled oscillator (NCO); and*

*a controller to selectively operate said carrier NCO based upon a carrier phase of said first carrier tracking loop to thereby facilitate switching to the format of the variable data.*

*84. A baseband processor according to claim 82 wherein said second carrier tracking loop comprises:*

*a carrier loop filter; and*

*a controller to selectively operating said carrier loop filter based upon a frequency of said first carrier tracking loop to thereby facilitate switching to the format of the variable data.*

*85. A baseband processor according to claim 78 wherein said modulator is further configured to partition data into four bit nibbles of sign (one bit) and magnitude (three bits) to said at least one orthogonal code function encoder.*

*86. A baseband processor according to claim 78 wherein the orthogonal code is a Walsh code modified by a modulo two addition of a fixed hexadecimal code thereto.*

*87. A baseband processor according to claim 78 wherein the orthogonal code is a bi-orthogonal code.*

*88. A baseband processor according to claim 78 wherein said at least one orthogonal code function correlator comprises:*

*a predetermined orthogonal code function generator; and*

*a plurality of parallel coupled correlators coupled to said orthogonal code function generator.*

*89. A baseband processor according to claim 78 wherein said modulator is configured to spread each data bit using a pseudorandom (PN) sequence at a chip rate and is configured to generate a preamble; and wherein said demodulator comprises preamble demodulator means for demodulating the preamble for achieving initial PN sequence synchronization.*

*90. A baseband processor according to claim 78 wherein said modulator comprises a scrambler; and wherein said demodulator comprises a descrambler.*

*91. A baseband processor for a spread spectrum radio transceiver, said baseband processor comprising:*

*a modulator for spread spectrum phase shift keying (PSK) modulating information for transmission, said modulator comprising*

*at least one encoder for encoding information for transmission,*

*wherein said modulator is configured to operate in one of a first format defined by bi-phase PSK (BPSK) modulation at a first data rate and a second format defined by quadrature PSK (QPSK) modulation at a second data rate, and*

*wherein said modulator is configured to modulate data packets to include a header at a third format defined by a modulation at a third data rate and variable data in one of the first and second formats; and*

*a demodulator for spread spectrum PSK demodulating received information, said demodulator comprising at least one correlator for decoding received information, wherein said demodulator is configured to operate in one of the first and second formats, wherein said demodulator is configured to demodulate data packets by demodulating the header at the third format and for switching to the respective one of the first and second formats of the variable data after the header, a first carrier tracking loop for the third format, and a second carrier tracking loop for the first and second formats.*

*92. A baseband processor according to claim 91 wherein the modulation of the third format is differential BPSK (DBPSK), and wherein the third data rate is lower than the first and second data rates.*

*93. A baseband processor according to claim 91 wherein said second carrier tracking loop comprises:*

*a carrier numerically controlled oscillator (NCO); and*

*a controller for selectively operating said carrier NCO based upon a carrier phase of said first carrier tracking loop to thereby facilitate switching to the format of the variable data.*

*94. A baseband processor according to claim 91 wherein said second carrier tracking loop comprises:*

*a carrier loop filter; and*

*a controller to selectively operate said carrier loop filter based upon a frequency of said first carrier tracking loop to thereby facilitate switching to the format of the variable data.*

*95. A baseband processor according to claim 91 wherein said modulator is configured to spread each data bit using a pseudorandom (PN) sequence at a chip rate and is further configured to generate a preamble; and wherein said demodulator is configured to demodulate the preamble for achieving initial PN sequence synchronization.*

*96. A baseband processor according to claim 91 wherein said modulator comprises a scrambler, and wherein said demodulator comprises a descrambler.*

*97. A modulator for a spread spectrum radio transceiver, said modulator configured to modulate information for transmission by spread spectrum phase shift keying (PSK), said modulator comprising at least one orthogonal code function encoder for encoding information according to an orthogonal code, wherein the orthogonal code is modified to have a reduced DC component for reducing an average DC signal component of the information encoded by the orthogonal code relative to that information being encoded by the orthogonal code in its unmodified state.*

*98. A modulator according to claim 97 wherein said modulator is configured to operate in one of first format*

*defined by bi-phase PSK (BPSK) modulation at a first data rate and a second format defined by quadrature PSK (QPSK) modulation at a second data rate.*

*99. A modulator according to claim 98 wherein said modulator is configured to modulate data packets to include a header at a third format defined by a modulation at a third data rate and variable data in one of the first and second formats.*

*100. A modulator according to claim 99 wherein the modulation of the third format is differential BPSK (DBPSK), and wherein the third data rate is lower than the first and second data rates.*

*101. A modulator according to claim 97 wherein said modulator is configured to partition data into four bit nibbles of sign (one bit) and magnitude (three bits) to said at least one orthogonal code function encoder, and wherein the orthogonal code is a Walsh code modified by a modulo two addition of a fixed hexadecimal code thereto.*

*102. A modulator according to claim 97 wherein said at least one orthogonal code function correlator comprises:*

*an orthogonal code function generator; and*

*a plurality of parallel coupled correlators coupled to said orthogonal code function generator.*

*103. A modulator according to claim 97 wherein the orthogonal code is a Walsh code modified by a modulo two addition of a fixed hexadecimal code thereto.*

*104. A modulator according to claim 97 wherein the orthogonal code is a bi-orthogonal code.*

*105. A demodulator for a spread spectrum radio transceiver, said demodulator configured to demodulate information by spread spectrum phase shift keying (PSK) demodulating information received from a radio circuit, said demodulator comprising at least one orthogonal code function correlator for decoding information according to an orthogonal code, wherein the orthogonal code is modified to have a reduced DC component for reducing an average DC signal component of the information decoded by the orthogonal code relative to that information being decoded by the orthogonal code in its unmodified state.*

*106. A demodulator according to claim 105 wherein said demodulator is configured to operate in one of first format defined by bi-phase PSK (BPSK) modulation at a first data rate and a second format defined by quadrature PSK (QPSK) modulation at a second data rate.*

*107. A demodulator according to claim 106 wherein said demodulator is configured to demodulate data packets including a header in a third format defined by a modulation at a third data rate and variable data in one of the first and second formats, and for switching to the respective one of the first and second formats of the variable data after the header.*

*108. A demodulator according to claim 107 wherein the modulation of the third format is differential BPSK (DBPSK), and wherein the third data rate is lower than the first and second data rates.*

*109. A demodulator according to claim 107 wherein said demodulator further comprises:*

*a first carrier tracking loop for the third format; and*

*a second carrier tracking loop for the first and second formats.*

*110. A demodulator according to claim 109 wherein said second carrier tracking loop comprises:*

*a carrier numerically controlled oscillator (NCO); and*

*a controller to selectively operate said carrier NCO based upon a carrier phase of said first carrier tracking loop to thereby facilitate switching to the format of the variable data.*

*111. A demodulator according to claim 109 wherein said second carrier tracking loop comprises:*

*a carrier loop filter; and*

*a controller to selectively operate said carrier loop filter based upon a frequency of said first carrier tracking loop to thereby facilitate switching to the format of the variable data.*

*112. A demodulator according to claim 105 further configured to partition data into four bit nibbles of sign (one bit) and magnitude (three bits).*

*113. A demodulator according to claim 105 wherein the orthogonal code is a Walsh code modified by a modulo two addition of a fixed hexadecimal code thereto.*

*114. A demodulator according to claim 105 wherein the orthogonal code is a bi-orthogonal code.*

*115. A demodulator according to claim 105 wherein said at least one orthogonal code function correlator comprises:*

*an orthogonal code function generator; and*

*a plurality of parallel coupled correlators coupled to said orthogonal code function generator.*

*116. A method for spread spectrum radio communication, the method comprising:*

*spread spectrum phase shift keying (PSK) modulating information for transmission while encoding the information according to an orthogonal code, wherein the orthogonal code is modified to have a reduced DC component for reducing an average DC signal component of the information encoded by the orthogonal code relative to that information being encoded by the orthogonal code in its unmodified state; and*

*spread spectrum PSK demodulating received information by decoding the received information according to the orthogonal code.*

*117. A method according to claim 116 further comprising AC-coupling received information for spread spectrum PSK demodulating so that the reduced average DC signal component in combination with the AC-coupling enhances overall performance.*

*118. A method according to claim 116 further comprising modulating and demodulating in one of first format defined by bi-phase PSK (BPSK) modulation at a first data rate and a second format defined by quadrature PSK (QPSK) modulation at a second data rate.*

*119. A method according to claim 118 further comprising:*

*modulating data packets to include a header at a third format defined by a modulation at a third data rate and variable data in one of the first and second formats; and*

*demodulating data packets by demodulating the header at the third format and for switching to the respective one of the first and second formats of the variable data after the header.*

*120. A method according to claim 119 wherein the modulation of the third format is differential BPSK (DBPSK), and wherein the third data rate is lower than the first and second data rates.*

*121. A method according to claim 116 wherein the orthogonal code is a Walsh code modified by a modulo two addition of a fixed hexadecimal code thereto.*

*122. A method according to claim 116 wherein the orthogonal code is a bi-orthogonal code.*

*123. A method of generating an rf signal for transmitting binary information in a packet format including a header field followed by a data field, comprising the steps of:*

*spread spectrum encoding a sequence of first data symbols from said binary information within said header*

*field by combining said first data symbols with a spreading sequence generated at a predetermined chip rate;*

*encoding a sequence of N-bit second data symbols, where N is greater than 1, from said binary information within said data field by generating for each of said N-bit second data symbols one of a set of $2^N$ chip sequences generated at the same chip rate as said spreading sequence and chosen from a set that is substantially orthogonal with low DC components; and*

*applying the spread-spectrum encoded symbols of said header field and selected chip sequences of said data field to the I and Q inputs of a phase shift modulator to produce said rf signal.*

*124. The method of claim 123 wherein each said chip sequence is generated by selecting an initial chip sequence in accordance with a first data segment of an N-bit second data symbol and differentially phase encoding said initial chip sequence in accordance with a second data segment of the same N-bit second data symbol.*

*125. A method of generating an rf signal for transmitting binary information in a packet format including a header field followed by a data field, comprising the steps of:*

*spread spectrum encoding a sequence of first data symbols from said binary information within said header field by combining said first data symbols with a spreading sequence;*

*encoding a sequence of N-bit second data symbols, where N is greater than 1, from said binary information within said data field by generating for each of said N-bit second data symbols one of a set of $2^N$ chip sequences chosen from a set that is substantially orthogonal with low DC components, each of said chip sequences being differentially phase encoded;*

*applying a reference phase based on encoding of the last of said first data symbols to the differential encoding of the first selected chip sequence; and*

*inputting said encoded symbols of said header field and said differentially encoded chip sequences of said data field to the I and Q inputs of a phase shift modulator to produce said rf signal.*

*126. The method of claim 125 wherein each said chip sequence is generated by selecting an initial chip sequence in accordance with a first data segment of an N-bit second data symbol and differentially phase encoding said initial chip sequence in accordance with a second data segment of the same N-bit second data symbol.*

*127. A method of generating an rf signal in a transmitter having a phase shift modulator with I and Q inputs comprising the steps of:*

*supplying a stream of binary information containing header data and payload data, said header data specifying at least a first payload data rate or a second payload data rate;*

*encoding said payload data when said header data specifies said first payload data rate by grouping said payload data into N-bit symbols, where N is greater than 1, and applying each N-bit symbol to select one of $2^N$ possible chip sequences and chosen from a set that is substantially orthogonal with low DC components;*

*encoding said payload data when said header data specifies said second payload data rate by grouping said payload data into 2N-bit symbols and applying each 2N-bit symbol to select one of $2^{2N}$ possible chip sequences; and*

*applying each selected chip sequence to the I and Q inputs of said phase shift modulator.*

*128. The method of claim 127 wherein the chip sequences selectable by said 2N-bit symbols include the chip sequences selectable by said N-bit symbols plus $2^{2N}$-$2^N$ additional chip sequences.*

*129. The method of claim 127 wherein the chip sequences selected by said N-bit symbols and said 2N-bit symbols are generated by selecting an initial chip sequence in accordance with a first data segment of an N-bit or 2N-bit symbol and differentially phase encoding the selected initial chip sequence in accordance with a second data segment of the same N-bit or 2N-bit symbol.*

*130. The method of claim 127 wherein each of the $2^{2N}$ chip sequences selectable by said 2N-bit symbols comprises an I/Q chip sequence having an I segment and a Q segment adapted to be synchronously applied to said I and Q inputs, respectively.*

*131. The method of claim 129 wherein N=4 and wherein each chip sequence selected by a 2N-bit symbol comprises an initial I/Q chip sequence having an I segment and a Q segment adapted to be synchronously applied to said I and Q inputs, respectively, said initial I/Q chip sequence being selected by 6 bits of a 2N-bit symbol and being differentially phase encoded in accordance with the other 2 bits of the same 2N-bit symbol.*

*132. A method of encoding binary data for transmission in packet format along with information encoded at a predetermined spread spectrum chip rate, said method comprising the steps of:*

*grouping said binary data into N-bit symbols;*

*applying a K-bit segment of each N-bit symbol to a chip sequence generator to select one of $2^K$ chip sequences, wherein each chip sequence is M chips in length and is a composite of an M-bit basic sequence and an M-bit modification sequence and chosen from a set that is substantially orthogonal with low DC components;*

*rotating the phase of the selected chip sequence in accordance with an N-K bit segment of the same N-bit symbol that selected said chip sequence; and*

*transmitting each phase-rotated, selected chip sequence at said predetermined chip rate.*

*133. A method of encoding binary data for transmission in packet format along with information encoded at a predetermined spread spectrum chip rate, said method comprising the steps of:*

*grouping said binary data into N-bit symbols;*

*applying a K-bit segment of each N-bit symbol to a chip sequence generator to select one of $2^K$ chip sequences chosen from a set that is substantially orthogonal with low DC components, wherein each chip sequence is M chips in length;*

*combining the selected basic chip sequence with a fixed, M-chip modification sequence to produce a selected M-chip composite chip sequence;*

*rotating the phase of the selected M-chip composite chip sequence in accordance with an N-K bit segment of the same N-bit symbol that selected said basic chip sequence; and*

*transmitting each phase rotated, selected composite chip sequence at said predetermined chip rate.*

* * * * *

UNITED STATES PATENT AND TRADEMARK OFFICE

CERTIFICATE OF CORRECTION

PATENT NO. : RE 40,231 E
APPLICATION NO. : 10/005483
DATED : April 8, 2008
INVENTOR(S) : Snell et al.

It is certified that error appears in the above-identified patent and that said Letters Patent is hereby corrected as shown below:

In column 9,
line 21 (claim 2) delete “one of first” and replace with --one of a first--;
line 28 (claim 3) delete “header at a” and replace with --header in a--;
line 33 (claim 3) delete “header at the third” and replace with --header in the third--;
In column 10,
line 67 (claim 18) delete “one of first” and replace with --one of a first--;
In column 11,
line 8 (claim 19) delete “header at a third” and replace with --header in a third--;
line 13 (claim 19) delete “header at the third” and replace with --header in the third--;
In column 12,
line 11 (claim 30) delete “header at a third” and replace with --header in a third--;
line 22 (claim 30) delete “header at the third” and replace with --header in the third--;
In column 13,
line 6 (claim 37) delete “first format” and replace with --a first format--;
line 52 (claim 45) delete “first format” and replace with --a first format--;
In column 14,
line 33 (claim 55) delete “for baseband” and replace with --for a baseband--;
line 53 (claim 57) delete “one of first” and replace with --one of a first--;
line 60 (claim 58) delete “header at a third” and replace with --header in a third--;
line 64 (claim 58) delete “the header at” and replace with --the header in--;
In column 15,
line 32 (claim 63) delete “one of first” and replace with --one of a first--;
In column 17,
line 6 (claim 79) delete “one of first” and replace with --one of a first--;
line 15 (claim 80) delete “comprises”;

UNITED STATES PATENT AND TRADEMARK OFFICE

CERTIFICATE OF CORRECTION

PATENT NO. : RE 40,231 E
APPLICATION NO. : 10/005483
DATED : April 8, 2008
INVENTOR(S) : Snell et al.

It is certified that error appears in the above-identified patent and that said Letters Patent is hereby corrected as shown below:

In column 18,
line 14 (claim 91) delete “header at a third” and replace with --header in a third--;
line 23 (claim 91) delete “header at the third” and replace with --header in the third--;
line 67 (claim 98) delete “one of first” and replace with --one of a first--;
In column 19,
line 6 (claim 99) delete “header at a third” and replace with --header in a third--;
line 41 (claim 106) delete “one of first” and replace with --one of a first--;
In column 20,
line 41 (claim 118) delete “one of first” and replace with --one of a first--;
line 46 (claim 119) delete “header at a third” and replace with --header in a third--;
line 50 (claim 119) delete “the header at” and replace with --the header in--.

Signed and Sealed this

Fifteenth Day of July, 2008

JON W. DUDAS
*Director of the United States Patent and Trademark Office*